Nov. 13, 1962 G. W. MOODY 3,063,704
INFLATABLE AUXILIARY LOAD SUPPORT UNITS
Filed Aug. 17, 1959 2 Sheets-Sheet 1

INVENTOR.
GEORGE WILLIAM MOODY
BY
ATTORNEYS

Nov. 13, 1962  G. W. MOODY  3,063,704
INFLATABLE AUXILIARY LOAD SUPPORT UNITS
Filed Aug. 17, 1959  2 Sheets-Sheet 2

INVENTOR.
GEORGE WILLIAM MOODY
BY
*Harman, Harman, & McCulloch*
ATTORNEYS

United States Patent Office
3,063,704
Patented Nov. 13, 1962

3,063,704
INFLATABLE AUXILIARY LOAD SUPPORT UNITS
George William Moody, Lansing, Mich., assignor to Universal Air Lift, Inc., Lansing, Mich., a corporation of Michigan
Filed Aug. 17, 1959, Ser. No. 834,167
4 Claims. (Cl. 267—65)

This invention relates to inflatable auxiliary support members for trucks and other vehicles to enable them to transport heavier loads than normally would be possible, and more particularly to a unit which is adapted to be mounted between the rear axle of the vehicle and the frame thereof. Pick-up and panel trucks are rated according to the pay load which they can carry without the rear end sagging dangerously and one of the prime objects of the instant invention is to provide inflatable units which remain tightly sealed and permit a smooth, level ride over rough roads under a top capacity overload, as well as a soft, comfortable ride when the vehicle is empty.

In designing a unit of the character described, which can in effect make a ton truck out of a one-half ton truck from the standpoint of the load that can be safely transported, certain problems are encountered. In the case of certain light trucks, and I have reference to trucks such as the 1959 light Dodge truck, the leaf springs are positioned so close to the side rails of the frame that relatively little clearance is available for the upper end of a pneumatic overload support member and the means for securing it to the frame and providing an effective upper end seal. An important object of this invention is, accordingly, to provide a unit of the character described which is so designed that its top end requires a minimum of space.

A further object of the invention is to provide an inflatable, overload support assembly which will be effectively mechanically sealed when the assembly is inflated to a high pressure as well as when the truck is unloaded and the assembly is deflated to a relatively low pressure.

Another object of the invention is to provide a pneumatic, overload support unit having a high variable rate or deflection with no significant change in damping characteristics over the range of pressures to be used so that the ride qualities of the vehicle are not affected adversely by the unit.

A further object of the invention is to provide an overload support unit which is used in pairs on a truck or the like so that inflation of each unit can be adjusted to level the bed under any load and the shock of bumps and shift of weight on turns is also readily absorbed.

Still a further object of the invention is to provide an overload support unit which can be readily assembled by hand and does not require an assembly press or the use of air as an assembly force with its attendant dangers.

A further object of the invention is to provide a rugged and durable overload support unit which has a long service life.

Still a further object of the invention is to provide an inexpensive support unit of the character described which can be readily installed on conventional trucks of various models.

Another object of the invention is to provide a unit so constructed at its upper end that the inflatable unit is retained in a predetermined position as well as effectively sealed for fluid pressure retention.

Other objects and advantages of the invention will be pointed out specifically or will become apparent from the following description when it is considered in conjunction with the appended claims and the accompanying drawings, in which:

Figure 1:
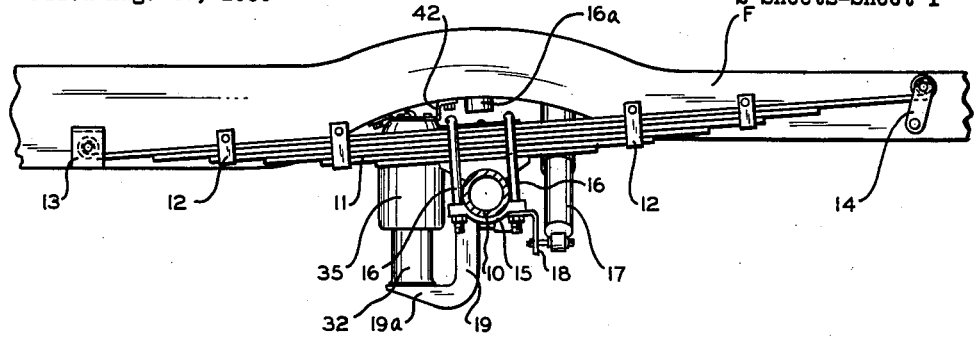
FIGURE 1 is a side elevational view showing one of the overload support units mounted in position on the rear axle of a pick-up truck so designed that its leaf spring is outside the side rail of the frame.

Referring now more particularly to the accompanying drawings, a letter F generally indicates one of the side sections of the vehicle frame which is shown conventionally supported on an axle 10 by a suspension system which includes a leaf spring assembly generally designated 11. The leaf spring assembly 11, which is maintained in assembled relation in the usual manner by leaf clips 12, is connected to the frame at its front end by a spring hanger 13 and at its rear end by a shackle 14, in the usual manner. Received on the axle 10 is a saddle member or clamp plate 15 which, by means of the conventional U-bolts 16, secures the leaf spring assembly to axle 10.

An axle snubber 16a may be provided as shown and a shock absorber 17 is usually connected between the axle and frame. The lower end of the shock absorber 17 can be secured to an angle plate 18 carried by one of the U-bolts 16. The construction described thus far is conventional and is illustrated only to place the unit of the present invention in its environment and to illustrate how the unit functions as an auxiliary suspension member.

The unit of the instant invention includes a generally hook-shaped bracket element 19 positioned on the axle 10 so that a leg portion 19a extends generally under the side frame member F. Bracket element 19 is formed of channel-like stock and is provided with a flat top flange portion or surface 19b, as shown. The member 19 may be termed the lower bracket and has integral clamp plate portion 20 provided with a curvilinear face 21 shaped to receive the axle 10. An axle clamp plate 22 having a similar curvilinear surface 23 for receiving the opposite surface of the axle 10 is provided as shown and openings 24 and 25 are provided in the upper and lower portions of the section 20 and plate 22, respectively, to pass clamp bolts 26 which, by means of nuts 27 and lock washers 28, operating in conjunction with diamonds 29 provided on the faces 21 and 23, securely fix the bracket 19 in position on the axle 10. The surfaces 21 and 23 are formed by upper and lower convergent portions extending at substantially 45° which lead to the diametral, central, curvilinear portions. This design permits clamping sections 20 and 22 to fit either uniformly annular or tapered annular axles ranging from 2½ inches to 3½ inches in diameter and must absorb the considerable torque forces which the imposition of a large load upon the portion 19b of element 19 creates. The diamonds, which are positioned at the upper and lower portions of the surfaces 21 and 23, dig into the axle regardless of its diameter and in the neighborhood of sixteen diamonds will preferably be in contact on each side of the axle. The element 22 must be constructed of a material stronger than the material from which the axle is constructed such that the concentrated loads at the diamond points would cause axle yielding before any fracturing of the parts 20 and 22.

Figure 2:
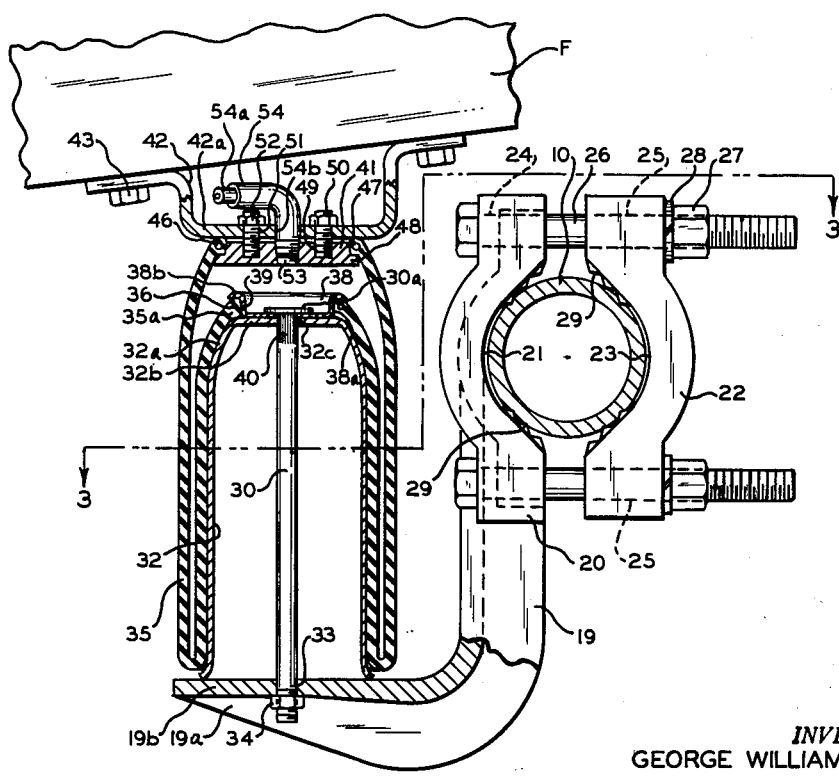
FIGURE 2 is an enlarged, partly sectional, side elevational view omitting some of the truck suspension elements to better illustrate the present unit.

Secured on the surface 19b of lower bracket member 19 by an elongated, threaded rod member 30 is a tubular piston member 32 which is curved at its upper end as at 32a and has a flat end portion 32b. The rod 30 passes through an opening 32c in the end wall 32b and an opening 33 in bracket section 19b and a nut 34 is provided to secure the piston 30 in position. The rod 30, which has a head portion 30a, also secures the inner, reversed end of an elastic, inflatable, sleeve member 35 which is curved at its inner or reversed end as at 35a to generally conform to the shape of surface 32a of the piston. The sleeve member 35, which is constructed of a suitably rugged and durable natural or synthetic rubber, is also provided with a tapering upper end portion, as shown, and is of slightly greater diameter throughout most of its length than piston 32. As shown particularly in FIGURES 2 and 4, the pressure condition inside the rubber sleeve member 35 for a particular load to be carried determines the degree to which the lower end of the sleeve member is turned reversely within the remainder of the sleeve member 35 and plainly during operation of the vehicle this condition will also be adjusted by road shocks and variances in load imposition. The slightly enlarged terminal end of the section 35a of the sleeve member 35 has an embedded, annular bead wire 36, as shown, and a cup-shaped member 38 having a cylindrical portion 38a of slightly greater diameter than the passage or opening 39 in this end of the sleeve member 35 is received in the opening 39, as shown. The cup-shaped member 38 also has a rolled over flange 38b and the terminal end of this end of the sleeve member 35 is snugly received between the portions 38a and 38b or perhaps more properly snugly receives the cup 38 in a manner to provide an airtight seal at the inner end of sleeve member 35. Rod member 30 has a knurled portion 40 and the bottom portion of its head 30a is furnace brazed all around to provide an airtight seal between the cup element 38 and the rod 30 passing through cap bore 38c.

Figure 5:
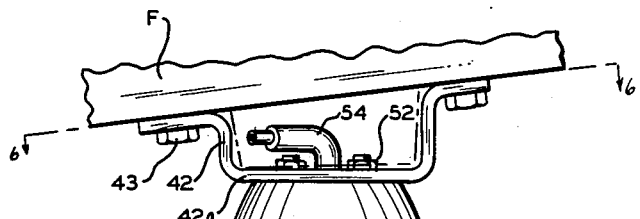
FIGURE 5 is an enlarged view of the upper end of the inflatable member.
Figure 5:
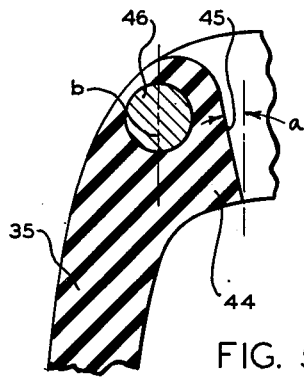
Figure 6:
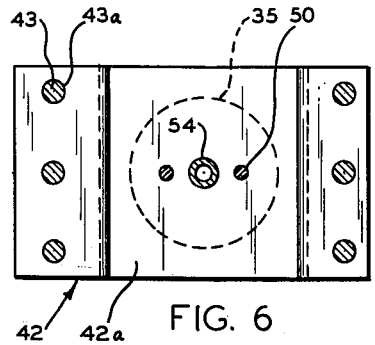
FIGURE 6 is a view of the upper bracket, taken on the line 6—6 of FIGURE 4.

At the opposite or upper end of sleeve member 35 a clamp plate 41 is provided which must perform the function of fixing the upper end of sleeve member 35 in position on the frame F while at the same time providing an effective seal under all conditions of pressurizing of sleeve member 35. Plate 41 is connected to a bracket 42 which is secured in position on the lower face of frame member F by self-tapping screws 43 passing through openings 43a and has a flat surface portion 42a parallel with the surface 19b and covering the entire top end of sleeve member 35. The plate 41 is particularly shaped to cooperate with the upper end of the sleeve member 35 which, as shown particularly in FIGURE 5, is provided with an internal shoulder portion or bead 44. The marginal wall of the end passage or opening 45 through the upper end of sleeve member 35 is inclined at an angle $a$ which may be 5° to the axis of the sleeve member 35. In the uppermost portion of this end of the sleeve member 35 is embedded an annular bead wire 46 as shown. For purposes of illustration, certain dimensions of the product may be of interest. The minimum diameter of surface 45 is 1.89 inches and the minimum diameter of plate 41 is 1.88 inches in one practical form of the device. Plate 41 has, as shown, a tapering, annular portion 47 and a laterally projecting peripheral flange 48, the maximum diameter of the tapering portion 47 being in the particular form mentioned two inches so that the tapering portion 47 is wedged into the passage 45. The external diameter of flange 48 is preferably the mean diameter of the solid bead wire 46 and in the instant case this dimension is 2.5 inches. If the external diameter of flange 48 is less than the minimum diameter of the bead wire 46, then an effective, durable seal is not provided and it is probable that there would not only be a continuous leak, but that the upper end of the sleeve member 35 could become detached from the plate 41. In the assembly of the plate 41 and sleeve member 35, the plate 41 is turned on edge for insertion through passage 45 such that the spring bead 46 deflects elliptically during insertion. If the diameter of flange 48 is greater than the mean diameter of the bead ring 46, difficulty would be encountered during manual assembly and the assembly would not be as durable as desired. By the mean diameter of annular wire 46, which in the instant case is .12 diameter wire, I mean the diameter taken at the centers of the cross sectional area at diametrically opposite points, as illustrated by the line $b$ in FIGURE 5. In the case illustrated, the wall thickness of sleeve member 35 is .1875 inch and the diameter of the body of sleeve member 35 is 3.31 inches, the diameter of the corresponding portion of piston 32 being 2.5 inches.

Provided in the plate 41 are threaded openings 49 receiving studs 50 passing through openings 51 in the portion 42a of the upper bracket 42, and nuts 52 are provided to secure the plate 41 in position as shown, slightly spaced from the external surface of portion 42a. With this arrangement the plate 41 cannot be dislodged from the upper end of sleeve member 35, even when there is relatively little pressure in sleeve member 35. It is important to note that the flange 48 underlies the bead wire 46 so that the extreme upper end of sleeve member 35 and plate 41 are, in effect, mechanically held together. In a construction in which this was not the case, and the seal and clamping were effected solely by compressed rubber, difficulty would be encountered since rubber takes a set and its service life is limited in a situation in which it must perform a holding or positioning function as well as a sealing function. Before the instant construction would fail there would have to be failure of the bead wire 46, or of flange 48, and consequently the construction is believed far more durable than if it were designed in another way.

Figure 4:
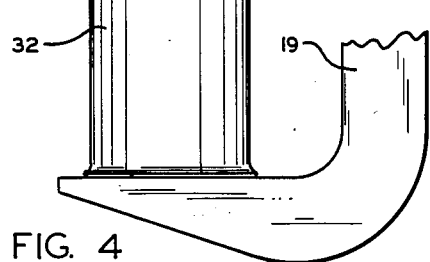
FIGURE 4 is a view similar to FIGURE 2 showing the unit in a greater state of inflation, to support a relatively heavy load.
Figure 3:
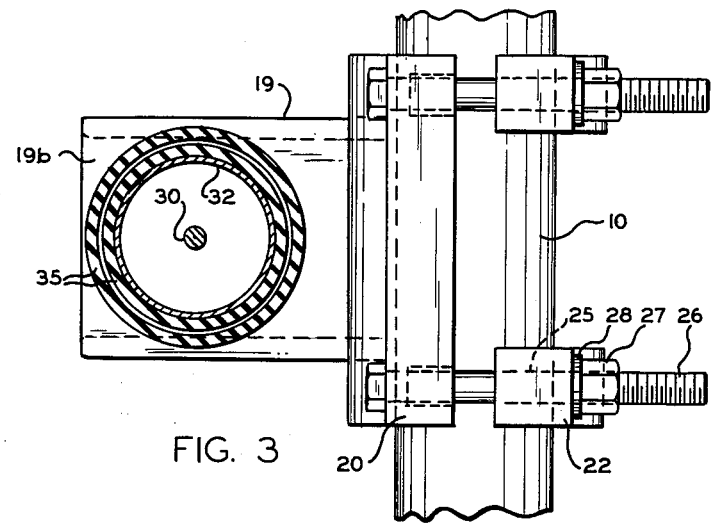
FIGURE 3 is a sectional plan view taken on the line 3—3 of FIGURE 2.

Also provided in plate 41 is a threaded, central opening 53 which receives the threaded lower end of a conventional inflation valve stem 54. The valve 54 is of the type presently in use to inflate and deflate pneumatic tires but is slightly longer, as will be noted. The valve, which is of the Schrader type, is initially straight but is bent angularly, once assembled, to extend through the opening 54b in bracket 42, as shown, so that easy access may be had to the valve core 54a thereof. The upper bracket 42 and lower bracket 19 are installed so that the piston member 30 and sleeve member 35 are truly vertical and shims can be used under the upper bracket 42 to insure this condition. When the truck is unloaded, about 10 p.s.i. pressure is maintained in the sleeve member 35, which will be in the position shown in FIGURE 2. With little pressure in the sleeve member 35, the seal is accomplished at the upper end of the sleeve member 35 by compression of the rubber between the flange 48 and the parallel surface of section 42a of the upper bracket 42, the nuts 52 being tightened down at the time of assembly of the elements to insure a properly sealed condition. When a considerably greater pressure is carried by the sleeve member 35 and the elements may be in the positions in which they are shown in FIGURE 4, the greater pressure will seal the upper end of the unit by itself since the flange 48 will tend to iron out the surface irregularities of the shoulder portion 44. If the pressure is above 25 p.s.i., for instance, it would not be necessary to provide a bracket 42 for sealing purposes, except that bracket 42 is necessary to fix the position of the upper end of the sleeve member 35. Thus, it is not necessary to so tighten the nuts 52 with the present construction to the extent that the rubber is very seriously deformed or compressed, in order to assure a seal at higher pressures. It should be noted that the bags may be inflated with pressures of as much as 110 p.s.i., in which case they may be capable of carrying an overload of around 1600 pounds.

When a considerable load is being borne by the units, the torque tending to twist clamp portions 20 and 22 on the axle is, of course, of great force. With the present design, however, the torque is effectively resisted because the diamonds dig into the axle, as previously mentioned, and the nuts 27 are tightened down with a torque wrench to 60–80 ft. pounds of torque. Also, the fact that the valve 54 is supported by the top plate 41, rather than provided in the sleeve member 35 wall, is important in view of the high pressures which are to be used.

The ride of the vehicle, whether loaded or unloaded, is much improved by the units, which have a controlled, uniform, damping characteristic. Further, with the plate 41 being positioned internally there is no danger of interference of a clamp plate with the leaf spring on the jounce stroke in cases where the leaf spring and side rail of the frame are mounted with a minimum spaced distance between them, as might be the case if an exterior bead and clamp plate were employed. In practice the unit is sold as an assembly, with the parts 42, 41, 35, 32, 30, and 19 in assembled relation. Mounting of the unit in position is an easy task which can be performed by the truck operator or by relatively unskilled personnel.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. In an inflatable, auxiliary load support apparatus for mounting between the axle assembly and frame of a truck vehicle or the like: a bracket having a base portion adapted to underlie said frame at a spaced distance therefrom; a generally vertically disposed, upright, piston-shaped member on said base portion; means clamping said bracket on the axle assembly; a flexible, inflatable, resilient, generally cylindrical sleeve member of generally slightly greater diameter than the said member having one end turned reversely inside the remainder thereof and sealably secured to the upper end of said piston-shaped member; a bracket adapted to be secured to said frame; a resilient bead embedded near the opposite upper end of the sleeve member; an inside end plate portion fixed on said bracket at a spaced distance therefrom having an enlarged peripheral flange forced inside and underlying said bead to secure the said end of the sleeve member, said end plate portion having a tapering, wedge-shaped section of greater maximum diameter than the maximum diameter of the opening through the upper end of the sleeve member received in and engaging said opening; the marginal wall of the opening in the upper end of the sleeve member tapering internally oppositely to the taper of said end plate portion; and valve means permitting inflation of said tube to the desired pressure.

2. In an inflatable, auxiliary load support apparatus for mounting between the axle assembly and frame of a truck vehicle or the like: a bracket having a base portion adapted to underlie said frame at a spaced vertical distance therefrom; a generally vertically disposed, upright, piston-shaped member on said base portion; means clamping said bracket on the axle assembly; a flexible, inflatable, resilient, generally cylindrical sleeve member of generally slightly greater diameter than the said member having one end turned reversely inside the remainder thereof and sealably secured to the upper end of said piston-shaped member; a bracket for securing to said frame having a substantially horizontal surface engaged by the opposite, upper end of the sleeve member, said sleeve member at its upper end having an end opening bounded by an internal shoulder; a resilient, continuous wire embedded in the shouldered section at the opposite upper end of the sleeve member; an end plate portion detachably fixed by said bracket at a spaced vertical distance therefrom having a body portion in wedged engagement with the marginal wall of the opening and an enlarged peripheral flange of a peripheral diameter greater than the internal diameter of the bead end, but substantially not greater than the mean diameter of the wire, inside said sleeve member and underlying said bead to secure the said end of the sleeve member; and valve means permitting inflation of said sleeve member to the desired pressure; said body portion of the end plate portion comprising a tapering, wedge-shaped section of a maximum diameter greater than the maximum diameter of the said end opening of the sleeve member but less than the internal diameter of said wire.

3. The combination defined in claim 2 in which said valve means comprises a valve stem extending through said end plate portion and surface of the bracket and being bent angularly.

4. The subject matter defined in claim 2 in which said means clamping the bracket on the axle assembly includes a clamping leg portion extending from said base portion of the bracket, a clamp plate opposite the clamping leg portion for clamping the bracket on the axle assembly, and diamond-like projections on the interior surfaces of the clamping leg portion and clamp plate for digging into the axle.

References Cited in the file of this patent

UNITED STATES PATENTS

| | | |
|---|---|---|
| 894,117 | Clark | July 21, 1908 |
| 1,039,537 | Hofmann | Sept. 24, 1912 |
| 2,051,458 | Patch | Aug. 18, 1936 |
| 2,901,242 | Elliott et al. | Aug. 25, 1959 |
| 2,945,702 | Winkelmann | July 19, 1960 |
| 2,960,333 | McGavern et al. | Nov. 15, 1960 |

FOREIGN PATENTS

| | | |
|---|---|---|
| 1,137,237 | France | Jan. 7, 1957 |